United States Patent
Mehri (10) Patent No.: US 11,725,502 B2
(45) Date of Patent: Aug. 15, 2023

(54) METHOD AND SYSTEM FOR DETERMINING WELL DELIVERY CONTRIBUTIONS USING ARTIFICIAL INTELLIGENCE

(71) Applicant: SAUDI ARABIAN OIL COMPANY, Dhahran (SA)

(72) Inventor: Baraket Mehri, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 287 days.

(21) Appl. No.: 17/097,404

(22) Filed: Nov. 13, 2020

(65) Prior Publication Data
US 2022/0154574 A1 May 19, 2022

(51) Int. Cl.
*E21B 47/13* (2012.01)
*E21B 43/1185* (2006.01)
(Continued)

(52) U.S. Cl.
CPC ............ *E21B 47/13* (2020.05); *E21B 43/114* (2013.01); *E21B 43/11852* (2013.01);
(Continued)

(58) Field of Classification Search
CPC .. E21B 47/13; E21B 43/114; E21B 43/11852; E21B 43/121; E21B 43/12;
(Continued)

(56) References Cited

U.S. PATENT DOCUMENTS 7,831,463 B2  11/2010 Nagar
7,832,500 B2 *  11/2010 Garcia ................... E21B 47/12
  340/853.3
(Continued)

FOREIGN PATENT DOCUMENTS

CA      2841771 A1 *  1/2013 ............. E21B 21/10
WO   2002029677 A2      4/2002

OTHER PUBLICATIONS

F.P. Iversen and et al, "Business Models and KPIs as Drivers for Drilling Automation", SPE Intelligent Energy International Conference and Exhibition held in Aberdeen, United Kingdom, Sep. 6-8, 2016 (Year: 2016).*
(Continued)

*Primary Examiner* — Douglas Kay
(74) *Attorney, Agent, or Firm* — Osha Bergman Watanabe & Burton LLP (57) ABSTRACT

A method may include obtaining well operation data regarding various well operations for a well delivery. The well operations may be performed by various service entities at a first well site. The method may further include determining a contribution weighting factor using a machine-learning model and the well operation data. The contribution weighting factor may correspond to a contribution of a first service entity among the service entities toward the well delivery. The method may further include determining, using the contribution weighting factor and an adjusted weighting factor, various performance indicator values for the first service entity. The adjusted weighting factor may be a weighting factor that is modified based on a size of the contribution weighting factor. The method may further include transmitting, based on the performance indicator values, a command to a second well site.

17 Claims, 6 Drawing Sheets

(51) Int. Cl.
*G06Q 50/02* (2012.01)
*G06N 3/084* (2023.01)
*G06Q 10/1093* (2023.01)
*E21B 43/114* (2006.01)
*E21B 43/12* (2006.01)

(52) U.S. Cl.
CPC ........... *E21B 43/121* (2013.01); *G06N 3/084* (2013.01); *G06Q 10/1097* (2013.01); *G06Q 50/02* (2013.01)

(58) Field of Classification Search
CPC .... E21B 2200/22; G06N 3/084; G06N 20/00; G06Q 10/1097; G06Q 50/02
See application file for complete search history.

(56) References Cited

U.S. PATENT DOCUMENTS

| | | | |
|---|---|---|---|
| 9,792,571 | B1 | 10/2017 | Mandava et al. |
| 10,364,662 | B1 | 7/2019 | Basu et al. |
| 10,402,770 | B2 | 9/2019 | Rai et al. |
| 2002/0072953 | A1 | 6/2002 | Michlowitz et al. |
| 2002/0107723 | A1* | 8/2002 | Benjamin .......... G06Q 30/0201 705/7.29 |
| 2010/0268575 | A1 | 10/2010 | McCauley |
| 2016/0063425 | A1 | 3/2016 | Fettig et al. |
| 2017/0328178 | A1 | 11/2017 | Lucas et al. |
| 2018/0106133 | A1* | 4/2018 | Bolchover .......... E21B 41/0092 |
| 2021/0115776 | A1* | 4/2021 | Gundersen ............ E21B 19/165 |
| 2021/0383308 | A1* | 12/2021 | Hanna .............. G06Q 10/06398 |
| 2022/0027862 | A1* | 1/2022 | Yepez .................... G06Q 10/20 |
| 2022/0120930 | A1* | 4/2022 | Kiselev .................... G01V 3/34 |
| 2022/0235633 | A1* | 7/2022 | Fehres ................ H04W 12/069 |

OTHER PUBLICATIONS

Z. P. Li and et al, "Supplier Selection Decision-Making in Supply Chain Risk Scenario Using Agent Based Simulation", IEEE, 2015 (Year: 2015).*

* cited by examiner

| Company | Service | Actual Contribution to WD [days] | Actual Contribution to WD [%] | Planned Contribution to WD [days] | Planned Contribution to WD [%] | DoA [%] | CtWD KPI Score [%] | Remaining WF [%] |
|---|---|---|---|---|---|---|---|---|
| Company-1 | service-5 | 78 | 4.9% | 100 | 7.5% | 122.0% | 6.0% | 95.1% |
| Company-2 | service-2 | 132 | 8.4% | 145 | 10.9% | 109.0% | 9.1% | 91.6% |
| Company-3 | service-4 | 106 | 6.7% | 80 | 6.0% | 67.5% | 4.5% | 93.3% |
| Company-4 | service-4 | 256 | 16.2% | 170 | 12.7% | 49.4% | 8.0% | 83.8% |
| Company-5 | service-3 | 190 | 12.0% | 150 | 11.2% | 73.3% | 8.8% | 88.0% |
| Company-6 | service-2 | 90 | 5.7% | 90 | 6.7% | 100.0% | 5.7% | 94.3% |
| Company-7 | service-1 | 110 | 7.0% | 55 | 4.1% | 0.0% | 0.0% | 93.0% |
| Company-8 | service-3 | 127 | 8.0% | 120 | 9.0% | 94.2% | 7.6% | 92.0% |
| Company-9 | service-1 | 60 | 3.8% | 21 | 1.6% | -85.7% | -3.3% | 96.2% |
| Company-10 | service-3 | 178 | 11.3% | 180 | 13.5% | 101.1% | 11.4% | 88.7% |
| Company-5 | service-5 | 50 | 3.2% | 45 | 3.4% | 88.9% | 2.8% | 96.8% |
| Company-7 | service-2 | 32 | 2.0% | 35 | 2.6% | 108.6% | 2.2% | 98.0% |
| Company-10 | service-2 | 61 | 3.9% | 50 | 3.7% | 78.0% | 3.0% | 96.1% |
| Company-3 | service-3 | 30 | 1.9% | 20 | 1.5% | 50.0% | 1.0% | 98.1% |
| Company-7 | service-5 | 53 | 3.4% | 45 | 3.4% | 82.2% | 2.8% | 96.6% |
| Company-10 | service-5 | 25 | 1.6% | 30 | 2.2% | 116.7% | 1.8% | 98.4% |

FIG. 5A

| Company | DoA | WF | CtWD KPI Score | Ranking |
|---|---|---|---|---|
| Company-10 | 98.5% | 16.7% | 16.5% | 1 |
| Company-5 | 76.9% | 15.2% | 11.7% | 2 |
| Company-2 | 109.0% | 8.4% | 9.1% | 3 |
| Company-4 | 49.4% | 16.2% | 8.0% | 4 |
| Company-8 | 94.2% | 8.0% | 7.6% | 5 |
| Company-7 | 55.6% | 12.4% | 6.9% | 6 |
| Company-1 | 122.0% | 4.9% | 6.0% | 7 |
| Company-6 | 100.0% | 5.7% | 5.7% | 8 |
| Company-3 | 64.0% | 8.6% | 5.5% | 9 |
| Company-9 | -85.7% | 3.8% | -3.3% | 10 |

METHOD AND SYSTEM FOR DETERMINING WELL DELIVERY CONTRIBUTIONS USING ARTIFICIAL INTELLIGENCE

BACKGROUND

To deliver a producing well, various operations are performed at a well site. Such operations may include drilling a well along with building infrastructure to transport hydrocarbons from a reservoir region inside the subsurface to a facility above ground. However, delays in one operation may result in a domino effect to delay other operations that must be performed in sequence. Thus, accurate evaluations of the entities responsible for each operation may enable efficient management of well operations and thereby improve the time required for delivering the producing well.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor, well operation data regarding various well operations for a well delivery. The well operations are performed by various service entities at a first well site. The method further includes determining, by the computer processor, a contribution weighting factor using a machine-learning model and the well operation data. The contribution weighting factor corresponds to a contribution of a first service entity among the service entities toward the well delivery. The method further includes determining, by the computer processor and using the contribution weighting factor and an adjusted weighting factor, various performance indicator values for the first service entity. The adjusted weighting factor is a weighting factor that is modified based on a size of the contribution weighting factor. The method further includes transmitting, by the computer processor and based on the performance indicator values, a command to a second well site to change the first service entity to a second service entity for performing a well operation.

In general, in one aspect, embodiments relate to a system comprising a drilling system coupled to a wellbore and a well operations manager including a computer processor and coupled to the drilling system. The well operations manager obtains well operation data regarding various well operations for a well delivery. The well operations are performed by various service entities at a first well site. The well operations manager further determines a contribution weighting factor using a machine-learning model and the well operation data. The contribution weighting factor corresponds to a contribution of a first service entity among the service entities toward the well delivery. The well operations manager further determines, using the contribution weighting factor and an adjusted weighting factor, various performance indicator values for the first service entity. The adjusted weighting factor is a weighting factor that is modified based on a size of the contribution weighting factor. The well operations manager further transmits, based on the performance indicator values, a command to a second well site to change the first service entity to a second service entity for performing a well operation.

In general, in one aspect, embodiments relate to a non-transitory computer readable medium storing instructions executable by a computer processor. The instructions obtain well operation data regarding various well operations for a well delivery. The well operations are performed by various service entities at a first well site. The instructions further determine a contribution weighting factor using a machine-learning model and the well operation data. The contribution weighting factor corresponds to a contribution of a first service entity among the service entities toward the well delivery. The instructions further determine, using the contribution weighting factor and an adjusted weighting factor, various performance indicator values for the first service entity. The adjusted weighting factor is a weighting factor that is modified based on a size of the contribution weighting factor. The instructions further transmit, based on the performance indicator values, a command to a second well site to change the first service entity to a second service entity for performing a well operation.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for evaluating various service entities based on contributions to a well delivery. In some embodiments, for example, artificial intelligence techniques are used to determine the contributions of different service entities, such as third party contractors, based on their well operations as part of an entire well delivery timeline. In particular, the impact of a single well operation may range from a small to a large effect on the actual well delivery target being met. Thus, for performance evaluation of service entities, a contribution weighting factor may normalize the performance of a specific service entity with respect to the performance of other service entities with respect to their own contributions. Likewise, this contribution performance indicator may be used with other technical and/or business performance indicators to determine an aggregate performance indicator value. As such, this aggregate performance indicator value may be a composite score for ranking different service entities. Based on the ranking, well operations may be modified or moved to different service entities, e.g., by a well operations manager that manages well operations for multiple well sites.

Furthermore, some embodiments provide a paradigm shift in service quality evaluations from using static or fixed weighting factors. For example, fixed weighting factors may lead to "unfair" evaluations and incorrect decision-making by treating the contribution of all service entities as being equal and thus directly comparable. However, methods and systems are provided with a machine-learning model that dynamically determines different contribution weighting factors and redistributes the weight of other performance indicators by readjusting weights.

By automating this evaluation process, a well operations manager may use artificial intelligence techniques to benchmark various service entities responsible for delivering a well to quantify actual contributions and evaluate performance. In contrast, non-productive time (NPT) is sometime the main key performance indicator (KPI) for evaluating service entities. Where NPT is measured based on the difference between actual performance time and the planned time, NPT may represent a negative driver of performance, e.g., to complete a single operation fast at the expense of other operations of other service providers. By knowing the actual contribution of a service entity to a well delivery timeline, for example, productive time may be improved by reducing invisible lost time (ILT). This increase in productive time may have a larger impact on overall well delivery performance than simple metrics based only on NPT.

Figure 1:
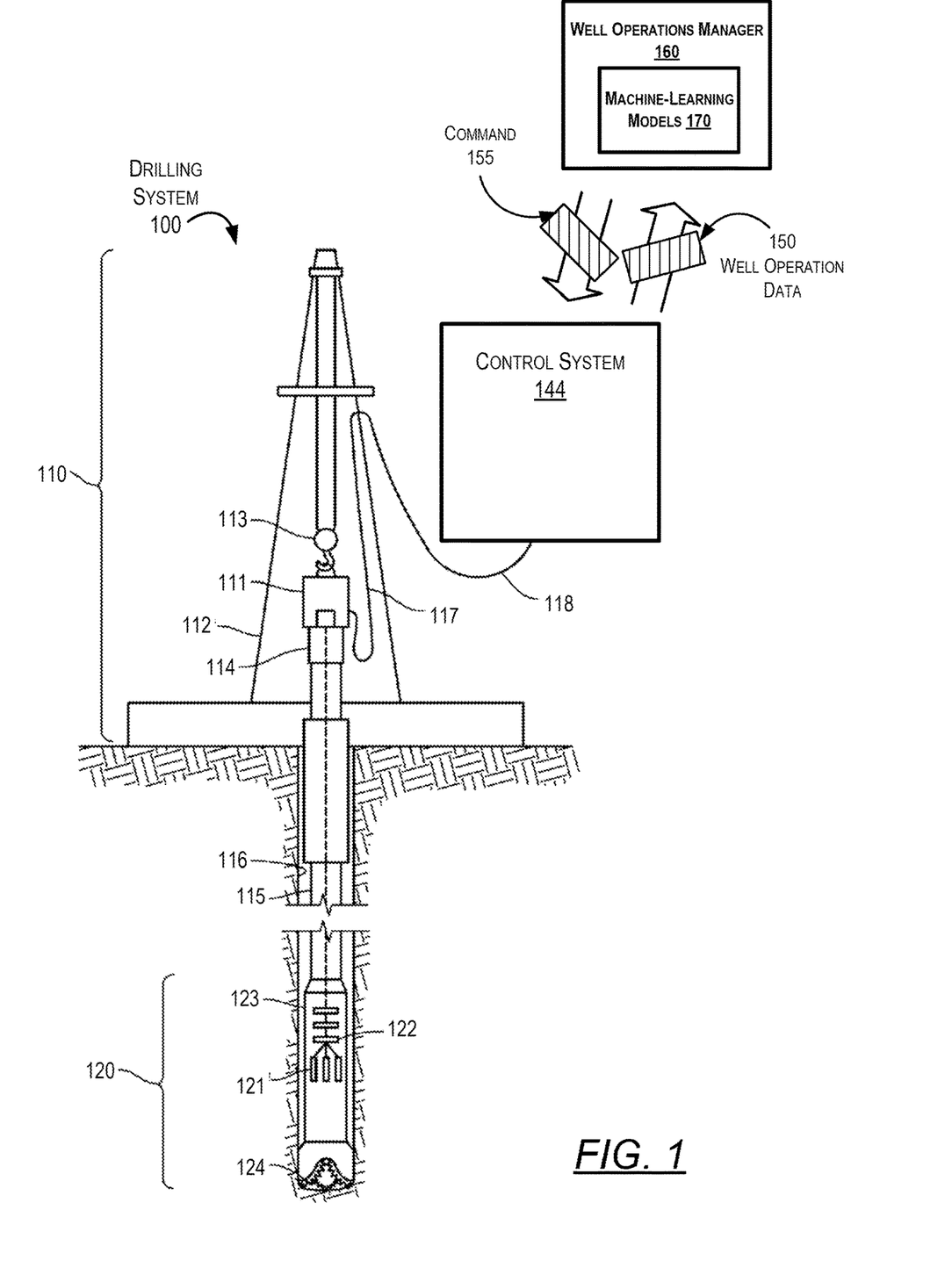
FIG. 1 shows a system in accordance with one or more embodiments.

Turning to FIG. 1, FIG. 1 shows a drilling system (100) that may include a top drive drill rig (110) arranged around the setup of a drill bit logging tool (120). A top drive drill rig (110) may include a top drive (111) that may be suspended in a derrick (112) by a travelling block (113). In the center of the top drive (111), a drive shaft (114) may be coupled to a top pipe of a drill string (115), for example, by threads. The top drive (111) may rotate the drive shaft (114), so that the drill string (115) and a drill bit logging tool (120) cut the rock at the bottom of a wellbore (116). A power cable (117) supplying electric power to the top drive (111) may be protected inside one or more service loops (118) coupled to a control system (144). As such, drilling mud may be pumped into the wellbore (116) through a mud line, the drive shaft (114), and/or the drill string (115).

The control system (144) may include one or more programmable logic controllers (PLCs) that include hardware and/or software with functionality to control one or more processes performed by the drilling system (100). Specifically, a programmable logic controller may control valve states, fluid levels, pipe pressures, warning alarms, and/or pressure releases throughout a drilling rig. In particular, a programmable logic controller may be a ruggedized computer system with functionality to withstand vibrations, extreme temperatures, wet conditions, and/or dusty conditions, for example, around a drilling rig. Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress. For example, the control system (144) may be coupled to the sensor assembly (123) in order to perform various program functions for up-down steering and left-right steering of the drill bit (124) through the wellbore (116). While one control system is shown in FIG. 1, the drilling system (100) may include multiple control systems for managing various well drilling operations, maintenance operations, well completion operations, and/or well intervention operations. For example, the control system (144) may include hardware and/or software with functionality for geosteering a drill bit through a formation in a lateral well using sensor signals, such as drilling acoustic signals or resistivity measurements.

The wellbore (116) may include a bored hole that extends from the surface into a target zone of the hydrocarbon-bearing formation, such as the reservoir. An upper end of the wellbore (116), terminating at or near the surface, may be referred to as the "up-hole" end of the wellbore (116), and a lower end of the wellbore, terminating in the hydrocarbon-bearing formation, may be referred to as the "down-hole" end of the wellbore (116). The wellbore (116) may facilitate the circulation of drilling fluids during well drilling operations, the flow of hydrocarbon production ("production") (e.g., oil and gas) from the reservoir to the surface during production operations, the injection of substances (e.g., water) into the hydrocarbon-bearing formation or the reservoir during injection operations, or the communication of monitoring devices (e.g., logging tools) into the hydrocarbon-bearing formation or the reservoir during monitoring operations (e.g., during in situ logging operations).

As further shown in FIG. 1, sensors (121) may be included in a sensor assembly (123), which is positioned adjacent to a drill bit (124) and coupled to the drill string (115). Sensors (121) may also be coupled to a processor assembly (123) that includes a processor, memory, and an analog-to-digital converter (122) for processing sensor measurements. For example, the sensors (121) may include acoustic sensors, such as accelerometers, measurement microphones, contact microphones, and hydrophones. Likewise, the sensors (121) may include other types of sensors, such as transmitters and receivers to measure resistivity, gamma ray detectors, etc. The sensors (121) may include hardware and/or software for generating different types of well logs (such as acoustic logs or sonic longs) that may provide well data about a wellbore, including porosity of wellbore sections, gas saturation, bed boundaries in a geologic formation, fractures in the wellbore or completion cement, and many other pieces of information about a formation. If such well data is acquired during well drilling operations (i.e., logging-while-drilling), then the information may be used to make adjustments to drilling operations in real-time. Such adjustments may include rate of penetration (ROP), drilling direction, altering mud weight, and many others drilling parameters.

In some embodiments, acoustic sensors may be installed in a drilling fluid circulation system of a drilling system (100) to record acoustic drilling signals in real-time. Drilling acoustic signals may transmit through the drilling fluid to be recorded by the acoustic sensors located in the drilling fluid circulation system. The recorded drilling acoustic signals may be processed and analyzed to determine well data, such as lithological and petrophysical properties of the rock formation. This well data may be used in various applications, such as steering a drill bit using geosteering, casing shoe positioning, etc.

Keeping with FIG. 1, when completing a well, one or more well completion operations may be performed prior to delivering the well to the party responsible for production or injection. Well completion operations may include casing operations, cementing operations, perforating the well, gravel packing, directional drilling, hydraulic stimulation of a reservoir region, and/or installing a production tree or wellhead assembly at the wellbore (116). Likewise, well operations may include open-hole completions or cased-hole completions. For example, an open-hole completion may refer to a well that is drilled to the top of the hydrocarbon reservoir. Thus, the well is cased at the top of the reservoir, and left open at the bottom of a wellbore. In contrast, cased-hole completions may include running casing into a reservoir region. Cased-hole completions are discussed further below with respect to perforation operations.

In one well delivery example, the sides of the wellbore (116) may require support, and thus casing may be inserted into the wellbore (116) to provide such support. After a well has been drilled, casing may ensure that the wellbore (116) does not close in upon itself, while also protecting the wellstream from outside incumbents, like water or sand. Likewise, if the formation is firm, casing may include a solid string of steel pipe that is run on the well and will remain that way during the life of the well. In some embodiments, the casing includes a wire screen liner that blocks loose sand from entering the wellbore (116).

In another well delivery example, a space between the casing and the untreated sides of the wellbore (116) may be cemented to hold a casing in place. This well operation may include pumping cement slurry into the wellbore (116) to displace existing drilling fluid and fill in this space between the casing and the untreated sides of the wellbore (116). Cement slurry may include a mixture of various additives and cement. After the cement slurry is left to harden, cement may seal the wellbore (116) from non-hydrocarbons that attempt to enter the wellstream. In some embodiments, the cement slurry is forced through a lower end of the casing and into an annulus between the casing and a wall of the wellbore (116). More specifically, a cementing plug may be used for pushing the cement slurry from the casing. For example, the cementing plug may be a rubber plug used to separate cement slurry from other fluids, reducing contamination and maintaining predictable slurry performance. A displacement fluid, such as water, or an appropriately weighted drilling fluid, may be pumped into the casing above the cementing plug. This displacement fluid may be pressurized fluid that serves to urge the cementing plug downward through the casing to extrude the cement from the casing outlet and back up into the annulus.

Keeping with well operations, some embodiments include perforation operations. More specifically, a perforation operation may include perforating casing and cement at different locations in the wellbore (116) to enable hydrocarbons to enter a wellstream from the resulting holes. For example, some perforation operations include using a perforation gun at different reservoir levels to produce holed sections through the casing, cement, and sides of the wellbore (116). Hydrocarbons may then enter the wellstream through these holed sections. In some embodiments, perforation operations are performed using discharging jets or shaped explosive charges to penetrate the casing around the wellbore (116).

In another well delivery, a filtration system may be installed in the wellbore (116) in order to prevent sand and other debris from entering the wellstream. For example, a gravel packing operation may be performed using a gravel-packing slurry of appropriately sized pieces of coarse sand or gravel. As such, the gravel-packing slurry may be pumped into the wellbore (116) between a casing's slotted liner and the sides of the wellbore (116). The slotted liner and the gravel pack may filter sand and other debris that might have otherwise entered the wellstream with hydrocarbons.

In another well delivery, a wellhead assembly may be installed on the wellhead of the wellbore (116). A wellhead assembly may be a production tree (also called a Christmas tree) that includes valves, gauges, and other components to provide surface control of subsurface conditions of a well.

In some embodiments, a well operations manager (160) is coupled to one or more control systems (e.g., control system (144)) at a wellsite. For example, a well operations manager (160) may include hardware and/or software to collect well operation data (e.g., well operation data (150)) from one or more well sites. Likewise, the well operations manager (160) may monitor various well operations performed by various service entities. In some embodiments, a well operations manager (160) is a controller located on a server remote from the well site. In another embodiments, a well operations manager may be similar to a control system coupled to the drilling system (100).

Moreover, a well operations manager (160) may include functionality for coordinating various oilfield services using various commands (e.g., command (155)), e.g., by transmitting commands to various network devices (e.g., control system (144)) in a drilling system as well as various user devices at the well site. In some embodiments, for example, a command is a network message that automatically assigns or reassigns tasks or operations to various service entities at a well site. For example, a well operations manager (160) may communicate with one or more service entities through various user devices, e.g., by receiving periodic status reports, sending messages through user interfaces, etc. Likewise, the well operations manager (160) may also collect other well operation data, such as sensor data from the drilling system (100), feedback through a human machine interface from other personnel at the well site, and/or data from a historian operating at the well site. The well operations manager (160) may be a computer system similar to computer system (602) described below in FIG. 6 and the accompanying description.

With respect to service entities, a service entity may be a company or other actor that performs one or more types of oil field services, such as well operations, at a well site. For example, one or more service entities may be responsible for performing a cementing operation in the wellbore (116) prior to delivering the well to a producing entity. Accordingly, service entities for the cementing operation may be analyzed and/or ranked using various performance indicators. Thus, performance indicators may permit the measurement and comparison of different service entities based on past and current operations. Likewise, a well operations manager (160) may use performance indicators to determine areas of improvement for particular service entities, trends regarding well operation quality, etc. Thus, performance indicators may identify poor performances and/or deteriorating situations at a well site that may be corrected by the well operations manager. Thus, performance indicator values may provide a "baseline" for evaluating the operational performance of service entities.

In some embodiments, a well operations manager (160) includes one or more machine-learning models (e.g., machine-learning models (170)) for determining contributions of a respective service entity to a well site delivery. For example, artificial intelligence techniques may assist a well operations manager in linking contributions of different service entities to a well delivery process (i.e., a well delivery process that includes one or more well operations) to the evaluate efficiency and service quality. In some embodiments, for example, a well operations manager (160) uses a machine-learning model to determine a contribution weighting factor for measuring a service entity's contribution to a particular well delivery, e.g., as part of a performance indicator score. For more information regarding contribution weighting factors and performance indicators, see FIGS. 2 and 4 below and the accompanying description.

With respect to machine-learning models, different types of machine-learning models may be used, such as convolutional neural networks, deep neural networks, recurrent neural networks, support vector machines, decision trees, inductive learning models, deductive learning models, supervised learning models, etc. In some embodiments, the well operations manager (160) may generate augmented or synthetic data to produce a large amount of interpreted data for training a particular model. Likewise, a machine-learning model may be trained using one or more machine-learning algorithms. For example, a backpropagation algorithm may be used to train a neural network. The training data may include well operation data from past well deliveries. Thus, a machine-learning model may predict well contributions at a well site using a trained machine-learning model.

With respect to neural networks, for example, a neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, a neural network may determine which data inputs should receive greater priority in determining one or more specified outputs of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer.

Figure 2:
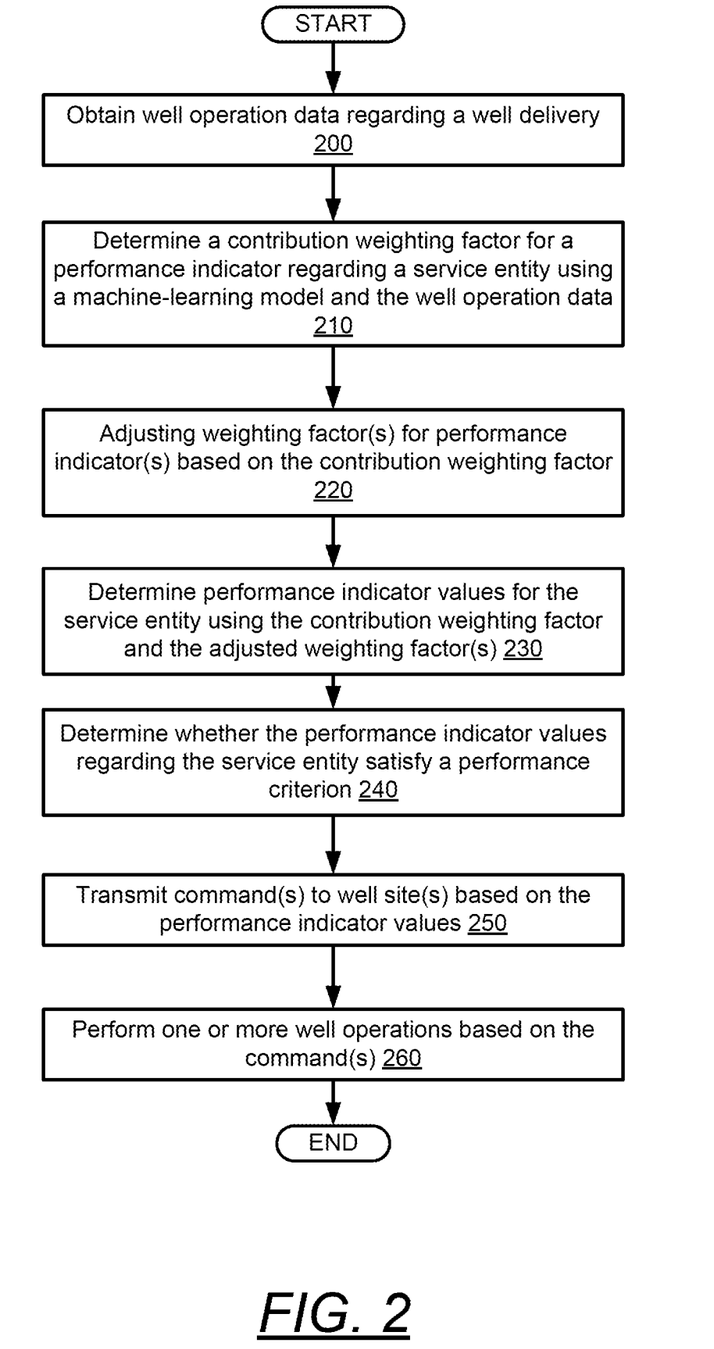
FIG. 2 shows a flowchart in accordance with one or more embodiments.

Turning to FIG. 2, FIG. 2 shows a flowchart in accordance with one or more embodiments. Specifically, FIG. 2 describes a general method for managing well operations using performance indicator values. One or more blocks in FIG. 2 may be performed by one or more components (e.g., well operations manager (160)) as described in FIG. 1. While the various blocks in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 200, well operation data is obtained regarding a well delivery in accordance with one or more embodiments. Well operation data may include drilling operation data, well completion data, and well intervention data. In particular, well operations may range from initial drilling at a well site to plugging and abandoning a producing well during decommissioning. For example, well operation data may be transmitted over a drilling network to a well operations manager or other software program, e.g., for storage in a database. As such, well operation data may be obtained in response to a request (e.g., from a user device) to perform an analysis of one or more service entities using various performance indicators. The request may be transmitted by a user device to a well operations manager, for example, or automatically generated by one or more control systems operating at a well site. Well operation data may include periodic progress reports, sensor data obtained from a drilling network, user-input data such as scheduled delivery dates and well delivery timelines. Well operation data may also include user feedback provided through a user device (e.g., personal computer or smart phone coupled to a well operations manager) regarding one or more well operations.

In Block 210, a contribution weighting factor for a performance indicator is determined regarding a service entity using a machine-learning model and well operation data in accordance with one or more embodiments. In some embodiments, for example, a contribution weighting factor (WF) corresponds to an actual contribution of a service entity to a well delivery. By knowing a service entity's actual contribution, the value of the service entity's performance may be normalized with respect to contributions by other service entities, i.e., entities that provided larger contributions to the success or failure of a well delivery date. Accordingly, the contribution weighting factor may be determined using a machine-learning model based on well operation data for previous well deliveries as well as current well deliveries. Thus, the distribution of weighting factors for various performance indicators may be dynamically computed towards a final performance score depending on the contribution of each service entity.

In some embodiments, for example, a performance indicator (PI) value for a service entity is expressed by the following equation:

$$\text{PI Value} = \text{Weighting Factor} \times \text{Degree of Achievement} \quad \text{Equation 1}$$

where the weighting factor (WF) may be expressed using the following equation:

$$WF = \frac{\text{Actual Time}}{\text{Total Well Delivery Time}} \quad \text{Equation 2}$$

where the "actual time" corresponds to an amount of time to complete one or more well operations by a service entity, the "total well delivery time" is the amount of time to complete all of the well operations for the well delivery, and the weighting factor in equation 2 corresponds to a percentage of the actual time with respect to the total time. Furthermore, a performance indicator may correspond to a degree of achievement (DOA) based on a comparison between the "actual time" for completing one or more well operations in relation to a scheduled amount of time as a portion of a well delivery timeline. Thus, in some embodiments, a degree of achievement value for a contribution to a well delivery time may be expressed using the following equation:

$$DoA\ Value = 1 - \frac{Actual\ time - Planned\ time}{Planned\ time} \quad \text{Equation 3}$$

where the "planned time" corresponds to a scheduled amount of time within a well delivery timeline.

Keeping with Block 210, Table 1 below illustrates an example where performance indicator values are determined for vendor A, vendor B, and other vendors for a particular well delivery using different contribution weighting factors.

TABLE 1

| Vendors | Actual Days Required for Well operations | Percentage of Well Delivery Timeline | Planned Days for Well Delivery Timeline | Percentage of Planned Well Delivery Timeline | DoA | PI Score |
|---|---|---|---|---|---|---|
| Vendor A | 2 | 2.0% | 4 | 4.7% | 150.0% | 3.0% |
| Vendor B | 15 | 15.0% | 12 | 14.0% | 75.0% | 11.3% |
| Other Vendors | 83 | 83.0% | 70 | 81.4% | | |
| | 100 | 100% | 86 | 100% | | |

As shown above in Table 1, vendor A exceeds expectations by finishing its well operation in two days against a scheduled four days in the well delivery timeline (i.e., resulting in a 50% time saving). In contrast, vendor B fails to meet the allotted time within the well delivery timeline, causing a three day delay against the timeline (i.e., resulting in a 25% time loss). However, since vendor B contributed more to well delivery (i.e., a 15% contribution to the well delivery) in comparison to vendor A (i.e., a 2% contribution to the well delivery), a performance indicator value based on a contribution weighting factor has vendor B being assigned a higher score.

Turning to Table 2, Table 2 illustrates another example where performance indicator values are determined using a fixed weighting factor, e.g., based on Equation 2 alone:

TABLE 2

| Vendors | Actual Days Required for Well operations | Fixed Weighting Factor [%] | Planned Days in Well Delivery | Planned time [%] | DoA | PI Score |
|---|---|---|---|---|---|---|
| Vendor A | 2 | 20.0% | 4 | 4.7% | 150.0% | 30.0% |
| Vendor B | 15 | 20.0% | 12 | 14.0% | 75.0% | 15.0% |
| Other Vendors | 83 | 20.0% | 70 | 81.4% | | |
| | 100 | | 86 | 100% | | |

As shown in Table 2 above, vendor A is considered to have a better performance when using a fixed weighting factor. In this example, weighting factors are distributed evenly, and thus the weighting factor is 20% for each vendor. Here, vendor A has a higher PI score (i.e., 30%), as vendor A's efficiency is considered better than vendor B's efficiency.

In Block 220, one or more weighting factors for performance indicators are adjusted based on a contribution weighting factor in accordance with one or more embodiments. In particular, a service entity may be analyzed using technical performance indicators and business performance indicators in addition to the service entity's contribution to a well delivery time. Example technical performance indicators may be based on various well delivery attributes such as tripping speed, tripping connection time, drill connection time, casing running speed, blowout preventer (BOP) work period, downtime, rig maintenance time, BHA handling time, cementing, circulating, run-in-hole (RIH) connection time, total RIH distance, pull-out-of-hole (POOH) connection time, POOH tripping speed, total POOH distance, and/or weight-to-weight connection time (e.g., time to perform drill pipe connection). Business performance indicators may include business considerations, such as footage drilled, budget compliance, total cost, footage cost, safety performance, etc. Some performance indicators may include both technical and business considerations, such as wellbore compliance (i.e., actual well trajectory within predefined tolerance of planned well trajectory).

Furthermore, different performance indicators may have corresponding metrics for measuring achievement of the performance indicator. These metrics may include determining the difference between actual and planned parameters, for example. Accordingly, these performance indicators may also have corresponding weighting factors for use in determining a final performance indicator value for one or more service entities. Thus, after determining a contribution weighting factor, weighting factors for other performance indicators are redistributed to compensate for the percentage of the total performance indicator value now allocated to the contribution weighting factor.

In Block 230, various performance indicator values are determined for a service entity using a contribution weighting factor and one or more adjusted weighting factors in accordance with one or more embodiments.

In Block 240, a determination is made whether performance indicator values regarding a service entity satisfy a predetermined performance criterion in accordance with one or more embodiments. In particular, a well operations manager may use predetermined performance criterion to analyze and compare performance indicator values between various service entities. For example, different service entities may be used to deliver wells. Thus, the predetermined performance criterion may be based on previous performance indicator values to determine trends. Likewise, predetermined performance criterion may also include threshold values to distinguish satisfactory performers from unsatisfactory performers. Thus, by benchmarking the efficiency of the service entities, for example, service entities with high performance indicator values may have increased usage, while service entities with low performance indicator values may have reduced usage or be terminated entirely.

For example, a predetermined performance criterion may correspond to an efficiency benchmark or SMART target (i.e., Specific, Measurable, Achievable, Realistic, and Time bound target) to determine one or more corrective actions for service entities that score lower than the efficiency benchmark (e.g., a performance indicator value of P-50 50$^{th}$ percentile). As such, the low performing service entities may be terminated, and their well operations (e.g., reducing their market share)) distributed amongst remaining service entities.

In Block 250, one or more commands are transmitted to one or more well sites based on various performance indicator values in accordance with one or more embodiments. In some embodiments, a well operations manager provides a graphical user interface to provide performance indicator values, rankings, performance trends, etc., to multiple user devices. Users may then use the graphical user interface to transmit various commands to change which service entities for performing various well operations. In response to receiving a notification regarding a low performance indicator value, for example, a well operations manager may automatically transmit a command to another well site to use a different service entity to perform one or more well operations.

In Block 260, one or more well operations are performed based on one or more commands in accordance with one or more embodiments.

In some embodiments, service companies are ranked or benchmarked according to performance to promote healthy competition and improve well delivery efficiency. In other words, top performers may be used, while low performers may be released or penalized.

Figure 3:
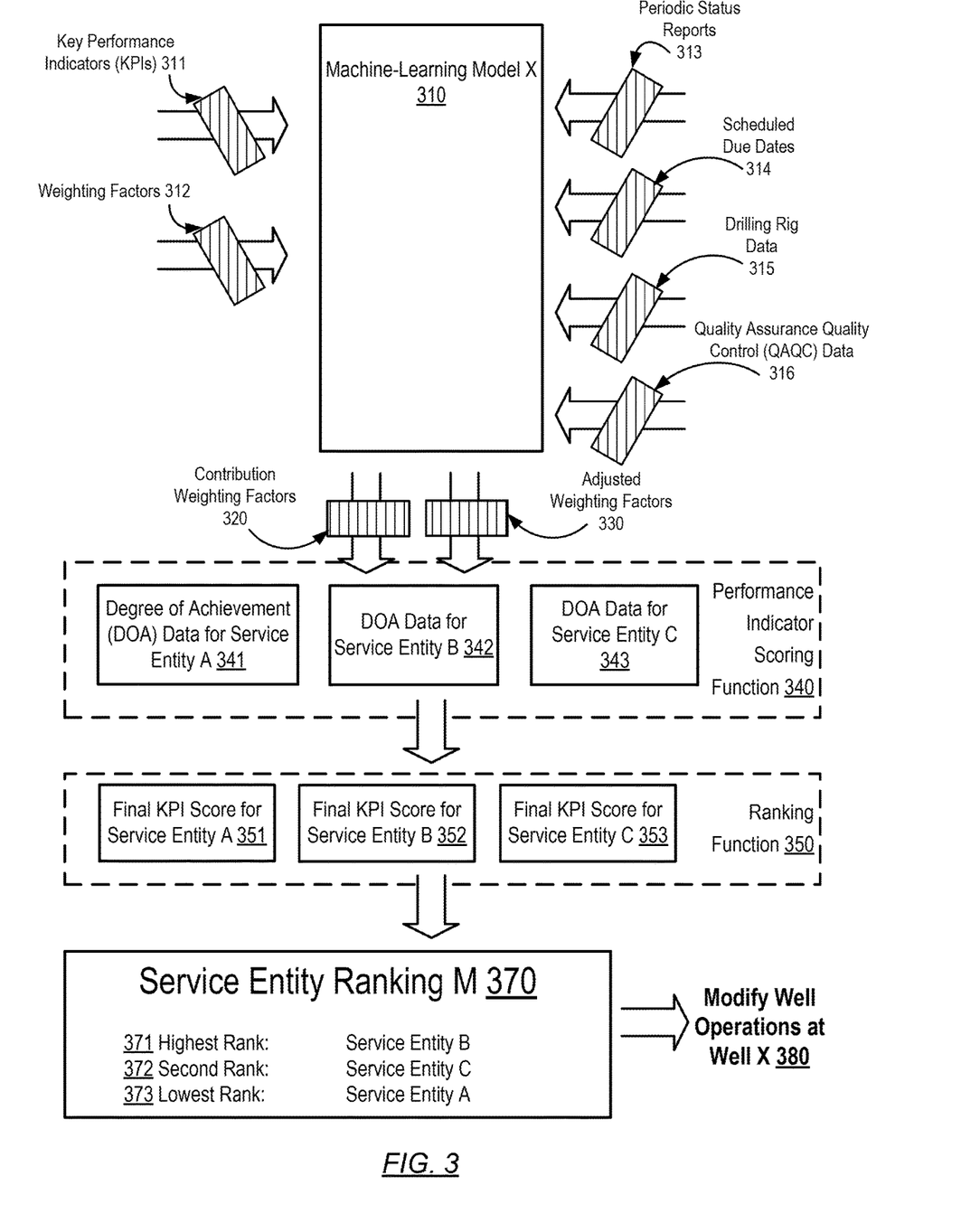
FIG. 3 shows an example in accordance with one or more embodiments.

Turning to FIG. 3, FIG. 3 provides an example of ranking service entities using key performance indicator (KPI) scores in accordance with one or more embodiments. The following example is for explanatory purposes only and not intended to limit the scope of the disclosed technology. In FIG. 3, a machine-learning model X (310) obtains various inputs for determining contributions of various service entities to a well delivery. More specifically, the machine-learning model X (310) obtains well operation data that includes periodic status reports (313) from various well operations, scheduled due dates (314) for well operations within a well delivery timeline, drilling rig data (315) (such as sensor data from drilling rig devices, such as control systems), quality assurance quality control (QAQC) data (316). Likewise, the machine-learning model X (310) also obtains key performance indicators (KPIs) (311) as well as weighting factors (312) for allocation the distribution of the KPIs (311) to a final KPI score for a service entity. Based on the inputs, the machine-learning model X (310) outputs contribution weighting factors (320) for various service entities as well as adjusted weighting factors (330) for use with the KPIs (311).

Keeping with FIG. 3, a well operations manager (not shown) uses the contribution weighting factors (320), the adjusted weighting factors (330), and various degree of achievement data (i.e., DOA data for service entity A (341), DOA data for service entity B (342), DOA data for service entity C (343)) with a performance indicator scoring function (340) to output final KPI scores for the service entities (i.e., final KPI score for service entity A (351), final KPI score for service entity B (352), final KPI score for service entity C (353)). Afterwards, the well operations manager applies a ranking function (350) to the final KPI scores (351, 352, 353) to determine a service entity ranking M (370). In the service entity ranking M (370), service entity B has the highest rank (371), service entity C has the second rank (372), and service entity A has the lowest rank (373).

Accordingly, the well operations manager modifies well operations at well X (380) based on the service entity ranking M (370).

Figure 4:
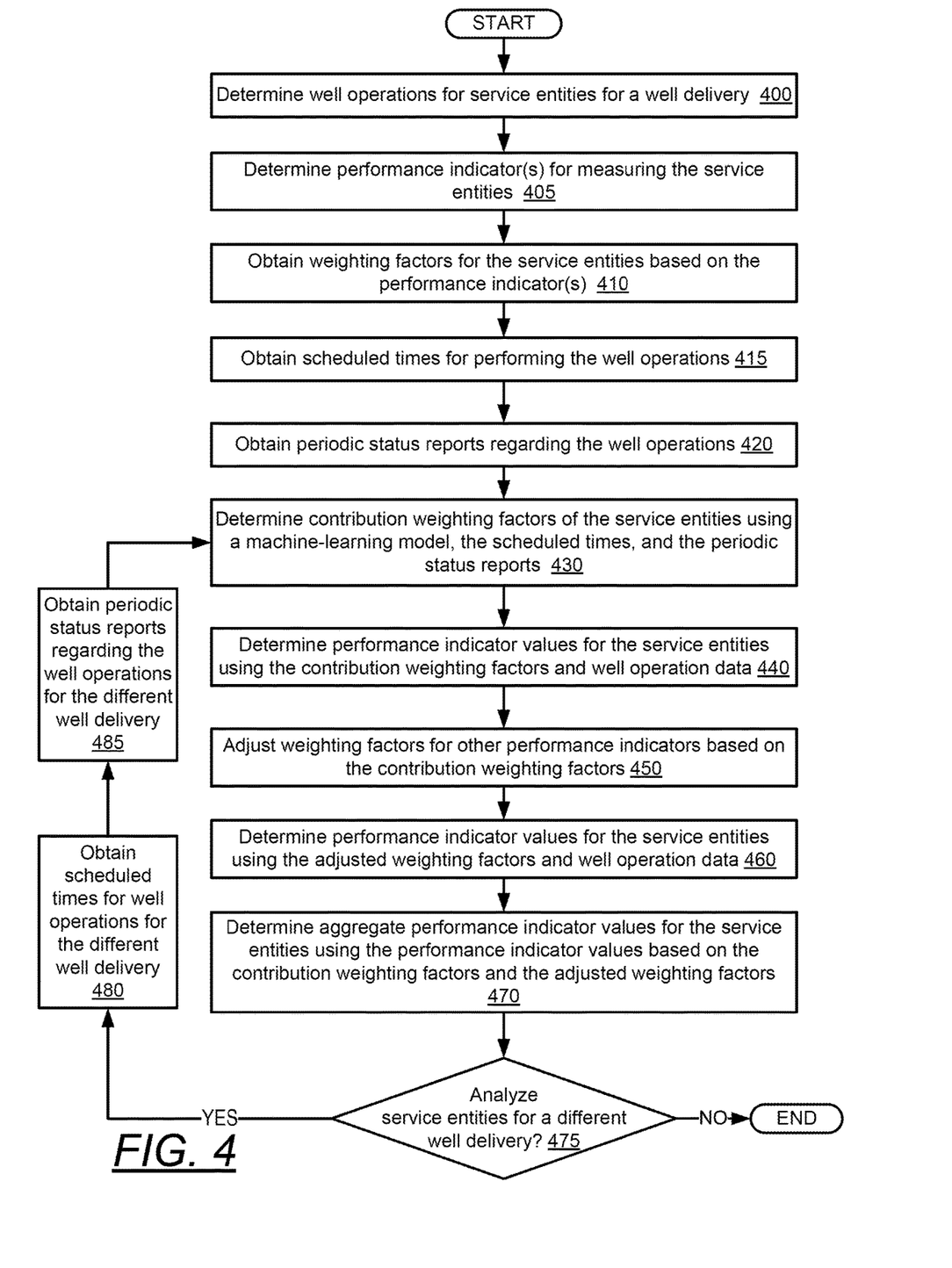
FIG. 4 shows a flowchart in accordance with one or more embodiments.

Turning to FIG. 4, FIG. 4 shows a flowchart in accordance with one or more embodiments. Specifically, FIG. 4 describes a specific method for determining performance indicator values for multiple service entities. One or more blocks in FIG. 4 may be performed by one or more components (e.g., well operations manager (160)) as described in FIG. 1. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, various well operations are determined for various service entities are determined for a well delivery in accordance with one or more embodiments. In particular, a well delivery plan may be determined for a well that includes one or more well operations. For example, well operations may include well drilling operations, well completion operations, and/or well intervention operations. Well intervention operations may include operations carried out on a well during hydrocarbon production that alters a particular state of the well or well geometry, provides well diagnostics, and/or manages the production of the well. Examples of well intervention operations may include pumping operations, wellhead maintenance operations, slickline operations, braided line operations, chemical circulation operations, a replacement completion operation, coiled tubing operations, etc.

Furthermore, the well delivery plan may be selected by a user using a user device or a well operations manager. Likewise, one or more service entities may be assigned to perform a particular well delivery within the well delivery plan. For example, company may be responsible for a cementing operation, while three companies may be responsible for a casing operation.

In Block 405, one or more performance indicators are determined for measuring various service entities in accordance with one or more embodiments. For example, a user may select multiple performance indicators within a graphical user interface. The well operations manager may then obtain the selection of the performance indicators for determining various performance indicator values or aggregate values (e.g., a final KPI score for a service entity).

In Block 410, one or more weighting factors are obtained for various service entities based on one or more performance indicators in accordance with one or more embodiments. Similar to the performance indicators, weighting factors may be selected by a user or automatically by a well operations manager. For example, weighting factors may default to be equal for a final performance indicator value. On the other hand, weighting factors may be adjusted using an artificial intelligence algorithm to predict future performance of well operations.

In Block 415, various scheduled times are obtained for performing various well operations in accordance with one or more embodiments. Where a well delivery timeline is used for managing a well site, scheduled times may be input by users or automatically determined by a well operations manager based on past operations. Accordingly, prior to beginning work on completing a well, the scheduled timeline may be known for various service entities assigned to different well operations.

In Block 420, various periodic status reports are obtained regarding various well operations in accordance with one or more embodiments. In some embodiments, a well operations manager may receive notifications automatically when various miles are performed during well operations. For example, a well operations manager may receive updates regarding the progress of a well path to a reservoir region. Likewise, a well operations manager may extract cost information from invoices and other information provided to the well operations manager. In some embodiments, a well operations manager uses one or more data mining techniques to obtain well operation data from the periodic status reports.

In Block 430, various contribution weighting factors of various service entities are determined using a machine-learning model, various scheduled times, and various periodic status reports in accordance with one or more embodiments. In some embodiments, for example, a contribution of a service entity is based on what portion of a total well delivery timeline is the service entity's well delivery. In another embodiment, a service entity's contribution depends on the contributions of other service entities. For example, a service entity's delay may be the result of failures and/or inefficiencies by other service entity's operating in parallel or substantially in parallel. Thus, a machine-learning model may use various inputs to approximate a service entity's actual contribution to a well delivery date.

Figure 5A:
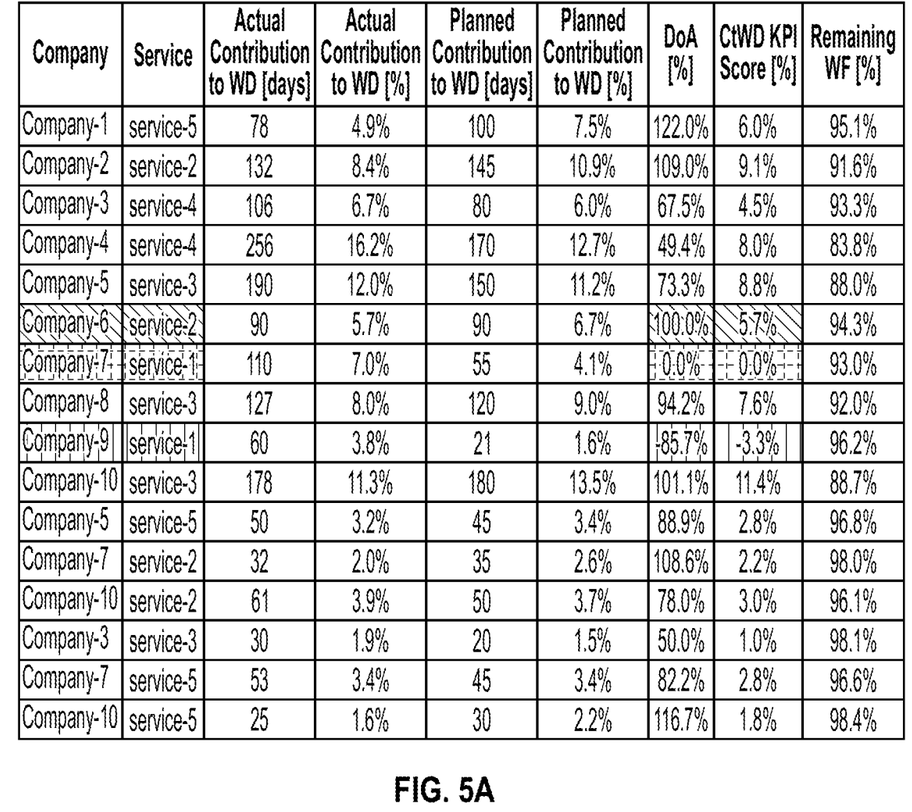
FIGS. 5A and 5B show examples in accordance with one or more embodiments.
Figure 5B:
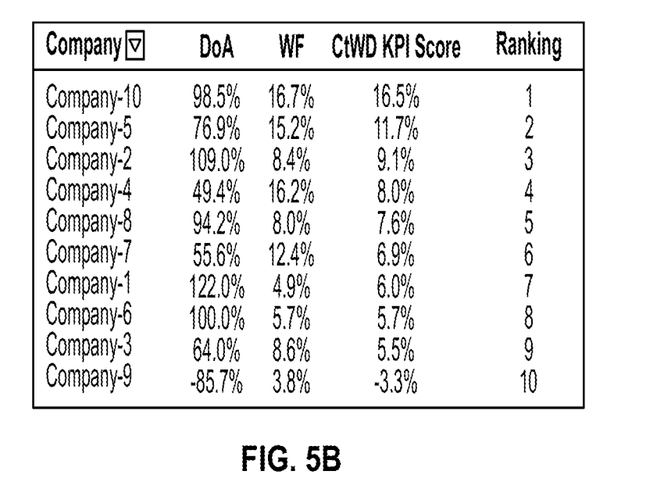

In Block 440, various performance indicator values are determined for various service entities using various contribution weighting factors and well operation data in accordance with one or more embodiments. The performance indicator values may be determined in a similar manner as described above with respect to Blocks 230 and 240. The well operation data may correspond to degree of achievement data obtained from periodic status reports, sensor data, manual user inputs, etc. FIG. 5A shows an example of various performance indicator values based on contribution weighting factors, i.e., the contribution to well delivery (CtWD) KPI score. FIG. 5B shows an example ranking based only on the CtWD KPI scores for ten companies.

In Block 450, various weighting factors are adjusted for other performance indicators based on various contribution weighting factors in accordance with one or more embodiments. Weighting factors may be adjusted in a similar manner as described above in Block 220 and the accompanying description.

In Block 460, various performance indicator values are determined for various service entities using various adjusted weighting factors and well operation data in accordance with one or more embodiments. After determining performance indicator values from contribution weighting factors, the other performance indicator values may be determined based on adjusted weighting factors.

In Block 470, various aggregate performance indicator values are determined for various service entities using various performance indicator values based on contribution weighting factors and adjusted weighting factors in accordance with one or more embodiments. As such, aggregated values may be determined from multiple performance indicator values. The aggregated values may be used in rankings or to select commands for managing well operations.

In Block 475, a determination is made whether to analyze service entities for a different well deliveries in accordance with one or more embodiments. In particular, service entity rankings and/or evaluations may be updated during and after individual well deliveries. For example, a well operations manager may score service entities over multiple well deliveries in order to detect trends or determine cumulative performance indicator values. Likewise, the well operations manager may transmit commands to well sites with pending well operations based on service entities current evaluation score. On the other hand, after transmitting a command to terminate a service entity from being used for a particular well operation, the service entity may no longer be evaluated. Where a determination is made that no further analysis is required for one or more service entities for a different well delivery, the process shown in FIG. 4 may end. Where a determination is made to analyze a different well delivery or a different set of service entities, the process shown in FIG. 4 may proceed to Block 480.

In Block 480, scheduled times for well operations are obtained for a different well delivery in accordance with one or more embodiments. The scheduled times may be obtained in a similar manner as described above in Block 415.

In Block 485, periodic status reports are obtained regarding various well operations for a different well delivery in accordance with one or more embodiments. The periodic status reports may be obtained in a similar manner as described above in Block 420.

Figure 6:
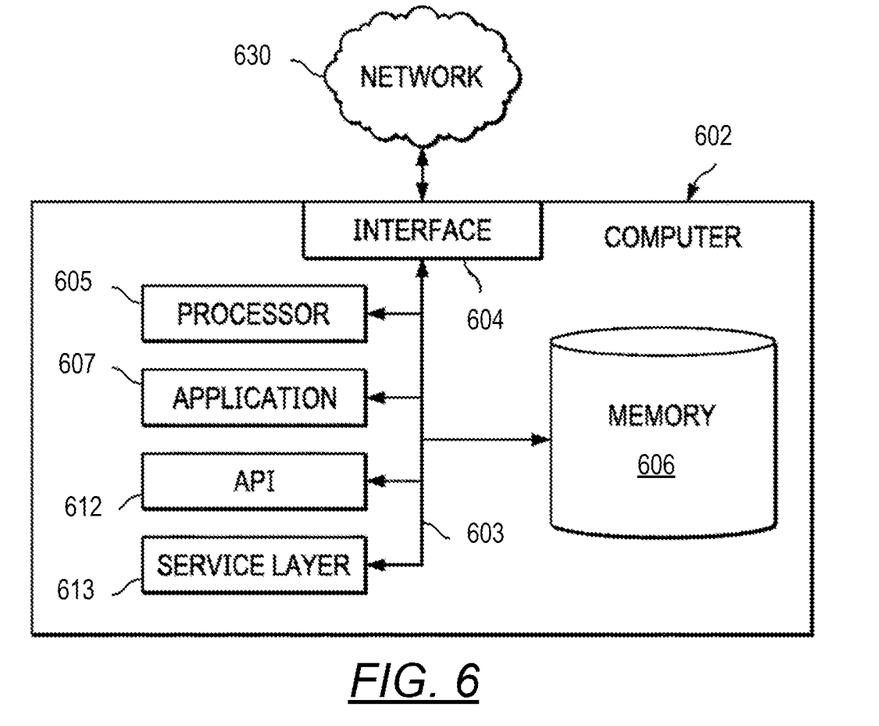
FIG. 6 shows a computer system in accordance with one or more embodiments.

Embodiments may be implemented on a computer system. FIG. 6 is a block diagram of a computer system (602) used to provide computational functionalities associated with described algorithms, methods, functions, processes, flows, and procedures as described in the instant disclosure, according to an implementation. The illustrated computer (602) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a GUI.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630). In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or other suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604) includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602).

There may be any number of computers (602) associated with, or external to, a computer system containing computer (602), each computer (602) communicating over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method, comprising:
    obtaining, by a computer processor, well operation data regarding a plurality of well operations for a well delivery, wherein the plurality of well operations are performed by a plurality of service entities at a first well site;
    determining, by the computer processor, a contribution weighting factor using a machine-learning model and the well operation data, wherein the contribution weighting factor corresponds to a contribution of a first service entity among the plurality of service entities toward the well delivery;
    determining, by the computer processor and using the contribution weighting factor and an adjusted weighting factor, a first plurality of performance indicator values for the first service entity, wherein the adjusted weighting factor is a weighting factor that is modified based on a size of the contribution weighting factor; and
    transmitting, by the computer processor and based on the first plurality of performance indicator values, a first command to a second well site to change the first service entity to a second service entity for performing one or more well operations,
wherein the plurality of well operations are selected from a group consisting of:
  inserting a casing into a wellbore at the first well site;
  pumping cement slurry into the wellbore and cementing the casing;
  producing a predetermined perforation at one or more locations within the wellbore using a bullet gun perforation technique, an abrasive perforation technique, or a water jet perforation technique;
  pumping a gravel slurry between the casing and a side of the wellbore; and
  installing a production tree on a wellhead of the wellbore.

2. The method of claim 1, further comprising:
obtaining, by a control system coupled to the second well site, the first command, and
performing, by the control system and in response to obtaining the first command, a well completion operation using the second service entity.

3. The method of claim 1, further comprising:
obtaining, by the computer processor, a scheduled date for performing a well completion operation in the well delivery;
determining, by the computer processor, an actual date that the well completion operation is performed at the first well site; and
determining, by the computer processor, a performance indicator value based on the contribution weighting factor and a difference between the scheduled date and the actual date.

4. The method of claim 1,
wherein the first plurality of performance indicator values form a portion of a performance indicator score for the first service entity, and
wherein the adjusted weighting factor corresponds to a performance indicator that is different from the contribution of the first service entity toward the well delivery.

5. The method of claim 1, further comprising:
determining whether a second plurality of performance indicator values for a third service entity satisfy a predetermined performance criterion,
wherein the predetermined performance criterion is based on a location of the third service entity within a ranking comprising the first service entity, the second service entity, the third service entity, and a fourth service entity; and
transmitting, in response to the second plurality of performance indicator values failing to satisfy the predetermined performance criterion, a second command to the second well site to change a well completion operation from the third service entity to the fourth service entity.

6. The method of claim 1,
wherein the well operation data is automatically extracted from a plurality of periodic status reports that are transmitted to a remote server regarding the plurality of well operations, and
wherein the well operation data are extracted using one or more data mining techniques.

7. The method of claim 1,
wherein the machine-learning model is a neural network that is trained using second well operation data from a plurality of well sites and a backpropagation algorithm.

8. A system, comprising:
a drilling system coupled to a wellbore; and
a well operations manager comprising a computer processor and coupled to the drilling system, wherein the well operations manager comprises functionality for:
  obtaining well operation data regarding a plurality of well operations for a well delivery, wherein the plurality of well operations are performed by a plurality of service entities at a first well site;
  determining a contribution weighting factor using a machine-learning model and the well operation data, wherein the contribution weighting factor corresponds to a contribution of a first service entity among the plurality of service entities toward the well delivery;
  determining, using the contribution weighting factor and an adjusted weighting factor, a first plurality of performance indicator values for the first service entity, wherein the adjusted weighting factor is a weighting factor that is modified based on a size of the contribution weighting factor; and
  transmitting, based on the first plurality of performance indicator values, a first command to a second well site to change the first service entity to a second service entity for performing one or more well operations,
wherein the plurality of well operations are selected from a group consisting of:
  inserting a casing into a wellbore at the first well site;
  pumping cement slurry into the wellbore and cementing the casing;
  producing a predetermined perforation at one or more locations within the wellbore using a bullet gun perforation technique, an abrasive perforation technique, or a water jet perforation technique;
  pumping a gravel slurry between the casing and a side of the wellbore; and
  installing a production tree on a wellhead of the wellbore.

9. The system of claim 8, further comprising:
a control system coupled to the drilling system,
wherein the control system obtains the first command from the well operations manager, and
wherein the control system performs a well completion operation using the second service entity in response to obtaining the first command.

10. The system of claim 8, wherein the well operations manager further comprises functionality for:
obtaining a scheduled date for performing a well completion operation in the well delivery;
determining an actual date that the well completion operation is performed at the first well site; and
determining a performance indicator value based on the contribution weighting factor and a difference between the scheduled date and the actual date.

11. The system of claim 8,
wherein the first plurality of performance indicator values form a portion of a performance indicator score for the first service entity, and
wherein the adjusted weighting factor corresponds to a performance indicator that is different from the contribution of the first service entity toward the well delivery.

12. The system of claim 8, wherein the well operations manager further comprises functionality for:
determining whether a second plurality of performance indicator values for a third service entity satisfy a predetermined performance criterion, wherein the predetermined performance criterion is based on a location of the third service entity within a ranking comprising the first service entity, the second service entity, the third service entity, and a fourth service entity; and transmitting, in response to the second plurality of performance indicator values failing to satisfy the predetermined performance criterion, a second command to the second well site to change a well completion operation from the third service entity to the fourth service entity.

13. The system of claim 8, wherein the well operation data is automatically extracted from a plurality of periodic status reports that are transmitted to a remote server regarding the plurality of well operations, and wherein the well operation data are extracted using one or more data mining techniques.

14. A non-transitory computer readable medium storing instructions executable by a computer processor, the instructions comprising functionality for:

obtaining well operation data regarding a plurality of well operations for a well delivery, wherein the plurality of well operations are performed by a plurality of service entities at a first well site;

determining a contribution weighting factor using a machine-learning model and the well operation data, wherein the contribution weighting factor corresponds to a contribution of a first service entity among the plurality of service entities toward the well delivery;

determining, using the contribution weighting factor and an adjusted weighting factor, a first plurality of performance indicator values for the first service entity, wherein the adjusted weighting factor is a weighting factor that is modified based on a size of the contribution weighting factor; and transmitting, based on the first plurality of performance indicator values, a first command to a second well site to change the first service entity to a second service entity for performing one or more well operations, wherein the plurality of well operations are selected from a group consisting of:
  inserting a casing into a wellbore at the first well site;
  pumping cement slurry into the wellbore and cementing the casing;
  producing a predetermined perforation at one or more locations within the wellbore using a bullet gun perforation technique, an abrasive perforation technique, or a water jet perforation technique;
  pumping a gravel slurry between the casing and a side of the wellbore; and
  installing a production tree on a wellhead of the wellbore.

15. The non-transitory computer readable medium of claim 14, wherein the instructions further comprise functionality for:

obtaining a scheduled date for performing a well completion operation in the well delivery;

determining an actual date that the well completion operation is performed at the first well site; and determining a performance indicator value based on the contribution weighting factor and a difference between the scheduled date and the actual date.

16. The non-transitory computer readable medium of claim 14, wherein the instructions further comprise functionality for:

determining whether a second plurality of performance indicator values for a third service entity satisfy a predetermined performance criterion, wherein the predetermined performance criterion is based on a location of the third service entity within a ranking comprising the first service entity, the second service entity, the third service entity, and a fourth service entity; and transmitting, in response to the second plurality of performance indicator values failing to satisfy the predetermined performance criterion, a second command to the second well site to change a well operation from the third service entity to the fourth service entity.

17. The non-transitory computer readable medium of claim 14, wherein the well operation data is automatically extracted from a plurality of periodic status reports that are transmitted to a remote server regarding the plurality of well operations, and wherein the well operation data are extracted using one or more data mining techniques.

* * * * *